US012070667B2

(12) United States Patent
Karas

(10) Patent No.: US 12,070,667 B2
(45) Date of Patent: Aug. 27, 2024

(54) SOCCER TRAINING EQUIPMENT AND KITS

(71) Applicant: SoccerTech Coaching, LLC, North Salt Lake, UT (US)

(72) Inventor: Rob Karas, North Salt Lake, UT (US)

(73) Assignee: SOCCERTECH COACHING, LLC, North Salt Lake, UT (US)

( * ) Notice: Subject to any disclaimer, the term of this patent is extended or adjusted under 35 U.S.C. 154(b) by 250 days.

(21) Appl. No.: 17/377,984

(22) Filed: Jul. 16, 2021

(65) Prior Publication Data

US 2022/0023732 A1 Jan. 27, 2022

Related U.S. Application Data

(60) Provisional application No. 63/054,646, filed on Jul. 21, 2020.

(51) Int. Cl.
*A63B 69/00* (2006.01)
*A63B 63/00* (2006.01)
*A63B 71/02* (2006.01)
*F21Y 115/10* (2016.01)

(52) U.S. Cl.
CPC .......... *A63B 69/002* (2013.01); *A63B 63/004* (2013.01); *A63B 69/0097* (2013.01); *A63B 71/03* (2020.08); *A63B 2209/10* (2013.01); *A63B 2210/50* (2013.01); *A63B 2214/00* (2020.08); *A63B 2220/801* (2013.01); *A63B 2220/833* (2013.01); *A63B 2225/62* (2013.01); *A63B 2225/74* (2020.08); *A63B 2243/0025* (2013.01); *F21Y 2115/10* (2016.08)

(58) Field of Classification Search
CPC ... A63B 69/002; A63B 69/0097; A63B 71/03; A63B 63/004; A63B 2225/74; A63B 2220/801; A63B 2220/833; A63B 2225/62; A63B 2243/0025
USPC .......................................................... 473/446
See application file for complete search history.

(56) References Cited

U.S. PATENT DOCUMENTS 4,529,390 A * 7/1985 Levy ...................... A63H 15/06 473/446
4,948,147 A 8/1990 Pallanca
5,988,646 A * 11/1999 Fair .................... A63B 69/0053 273/374
6,554,284 B2 * 4/2003 Chou ..................... A63B 63/00 473/192

(Continued)

OTHER PUBLICATIONS

Blazepod Ltd; “Kick through your potential”; website; located at: https://www.blazepod.com/pages/soccer; accessed on Apr. 19, 2023.

(Continued)

*Primary Examiner* — Mitra Aryanpour
(74) *Attorney, Agent, or Firm* — MASCHOFF BRENNAN

(57) ABSTRACT

A soccer training device can include: a body having a front surface facing a first direction; and an illuminating contact sensor associated with the body so that a light emitter is visible and capable of emitting light in substantially the same first direction that the front surface faces and so that a force contact above a predetermined threshold with the body is sensed by a sensing module. In some aspects, the illuminating contact sensor is at least one of: coupled with the soccer training member; removable from the soccer training member; or integrated with the soccer training member.

20 Claims, 11 Drawing Sheets

(56) References Cited

U.S. PATENT DOCUMENTS

| | | | | |
|---|---|---|---|---|
| 6,926,624 | B1 * | 8/2005 | Witzke | A63B 63/06 473/446 |
| 7,604,570 | B2 | 10/2009 | Wilkins et al. | |
| 7,661,679 | B2 * | 2/2010 | Mah | A63B 63/004 473/446 |
| 8,109,845 | B2 * | 2/2012 | Duty | A63B 63/004 473/446 |
| 8,506,370 | B2 * | 8/2013 | Homsi | A63B 24/0084 463/2 |
| 9,028,346 | B2 | 5/2015 | Melin | |
| 9,199,148 | B2 * | 12/2015 | Krohl | A63B 69/0097 |
| 9,238,165 | B2 | 1/2016 | Marty et al. | |
| 9,266,002 | B2 | 2/2016 | Dunster | |
| 9,457,249 | B2 * | 10/2016 | Goldberg | A63B 63/004 |
| 9,533,208 | B2 | 1/2017 | Wright | |
| 9,791,246 | B2 * | 10/2017 | D'Andrade | A63B 24/0087 |
| 9,808,671 | B2 | 11/2017 | D'Andrade et al. | |
| 10,112,094 | B1 | 10/2018 | Odorisio et al. | |
| 10,279,216 | B2 | 5/2019 | D'Andrade et al. | |
| 10,653,938 | B1 | 5/2020 | Gudmundur | |
| 11,364,418 | B2 | 6/2022 | Piazza et al. | |
| 11,534,671 | B2 | 12/2022 | Colding et al. | |
| 2002/0042312 | A1 * | 4/2002 | Decloux | A63B 69/0053 473/476 |
| 2004/0063521 | A1 | 4/2004 | Oister et al. | |
| 2004/0259689 | A1 | 12/2004 | Wilkins et al. | |
| 2013/0178315 | A1 | 7/2013 | Wright | |
| 2014/0349786 | A1 | 11/2014 | Melin | |
| 2014/0369695 | A1 | 12/2014 | D'Andrade et al. | |
| 2015/0283443 | A1 * | 10/2015 | Dunser | A63B 71/0619 473/422 |
| 2016/0107057 | A1 * | 4/2016 | Wisegarver | A63B 43/06 473/446 |
| 2017/0059286 | A1 | 3/2017 | D'Andrade | |
| 2018/0214744 | A1 | 8/2018 | D'Andrade et al. | |
| 2019/0366158 | A1 | 12/2019 | D'Andrade et al. | |
| 2020/0108291 | A1 | 4/2020 | Piazza et al. | |
| 2021/0220715 | A1 | 7/2021 | Colding et al. | |
| 2022/0023732 | A1 * | 1/2022 | Karas | A63B 63/004 |
| 2023/0039137 | A1 | 2/2023 | Tomikawa et al. | |
| 2023/0050406 | A1 | 2/2023 | Tomikawa et al. | |
| 2023/0112825 | A1 | 4/2023 | Colding et al. | |

OTHER PUBLICATIONS

Fitlight; "The Most Advanced Light Training System in the World"; website; located at: https://www.fitlighttraining;com; accessed on Apr. 19, 2023.

* cited by examiner

SOCCER TRAINING EQUIPMENT AND KITS

CROSS-REFERENCE TO RELATED APPLICATIONS

This patent application claims priority to U.S. Provisional Application No. 63/054,646 filed Jul. 21, 2020, which provisional is incorporated herein by specific reference in its entirety.

BACKGROUND

Field

The present disclosure relates to soccer training equipment. More particularly, the present disclosure relates to soccer training equipment with an illuminating contact sensor or soccer training equipment configured as a shot deflector.

Description of Related Art

Various training tools have been created for improving soccer skills. Some examples of soccer training equipment include hard rebound boards, soft rebound nets or sheet (e.g., canvas goal targets), soccer mannequins, gates, flags, cones, and the like. Additionally, hi-tech training equipment for various types of trainings and therapies have been created. However, with all of the advances in soccer training equipment and hi-tech training equipment, there still remains a need for better soccer training equipment that may utilize advantages of hi-tech training equipment.

Additionally, various other types of soccer training equipment also can be useful for specific training. For example, goalies may need training on different shot trajectories or deflected shots. Therefore, it would be advantageous to have soccer training equipment configured to deflect soccer shots.

SUMMARY

In some embodiments, a soccer training device can include: a body having a front surface facing a first direction; and an illuminating contact sensor associated with the body so that a light emitter is visible and capable of emitting light in substantially the same first direction that the front surface faces and so that a force contact above a predetermined threshold with the body is sensed by a sensing module. In some aspects, the illuminating contact sensor is at least one of: coupled with the soccer training member; removable from the soccer training member; or integrated with the soccer training member.

In some embodiments, the soccer training device includes a connecting member coupled at a first end to the soccer training member and coupled at a second end to the illuminating contact sensor. The light emitter is visible and capable of emitting light in the first direction and the sensing module senses an impact on the soccer training member through the connecting member.

In some embodiments, the soccer training device includes a receptacle having the illuminating contact sensor so that the force contact with the body vibrates or otherwise activates the illuminating contact sensor. In some aspects, the receptacle is formed by at least one receptacle member that is a pliable material or rigid material or includes at least one adjustable strap. In some aspects, a clear front receptacle member is used, which can be a clear member or a body portion defining an aperture for directing the emitted light. In some aspects, the receptacle has a receptacle opening that opens upwardly when the soccer training device is in use, thereby the receptacle forming a top opened receptacle. In some aspects, the body includes an aperture adapted to allow light from the illuminating contact sensor to pass therethrough in the first direction.

In some embodiments, the soccer training device is configured as a rebound board, goal target barrier, dummy, or combination thereof.

In some embodiments, the soccer training device is configured as a rebound board includes at least one of: the body having a flat front surface that is rigid and structurally sufficient to rebound a soccer ball; a receptacle in or on the body configured to house the illuminating contact sensor; the illuminating contact sensor in the receptacle integrated with the body or couplable with the body; or a handle at a top region of the body, wherein the rebound board is portable and carriable with a single hand.

In some embodiments, the soccer training device includes at least one extending support coupled with the body of the rebound board. In some aspects, the at least one extending support extends in a manner to support the body in a vertical position (e.g., 90 degrees, or 80-100 degrees, or 70-10 degrees) such that the extending support is normal or at some angle relative to the flat front surface of the body. In some aspects, the extending support is coupled to the body via a rotatable hinge, such that the extending support can be rotated from a flat storage position to an extended position for use. In some aspects, a plurality of the extending supports are rotatably coupled to the body.

In some embodiments, the soccer training device is configured as a goal target barrier that includes: a rectangular body having a front surface dimensioned as a soccer goal, wherein the body is configured to mount to a soccer goal by connecting to one or more soccer goal frame members; a plurality of markers within a boundary of the soccer goal and attached to a front surface of the body that faces in the first direction; a receptacle for each marker; and a plurality of illuminating contact sensors coupled or integrated with the body or the plurality of markers so as to illuminate in the first direction from the respective marker.

In some embodiments, the soccer training device includes at least one of: the plurality of markers are different colors; the plurality of markers are removably attachable with the rectangular body of the goal target barrier; the plurality of markers each include a fastener to removably fasten to the body; the plurality of markers form a part of the surface of the body located in at least two corners or four corners; the plurality of markers each attach to a front surface of the body; or the plurality of markers are each adapted to extend from a side surface or side edge of the body. In some aspects, the receptacle is configured to be removable from the rectangular body and/or the marker.

In some embodiments, the soccer training device is configured as an inflatable barrier comprising: an inflatable body dimensioned as an inflatable barrier; a receptacle attached to or formed into the inflatable body; and the illuminating contact sensor in the receptacle so that the light emitter is visible and so that the contact with the inflatable body is sensed by a sensing module.

In some embodiments, a shot deflector can include: a frame adapted to form a ground-level plane; and a plurality of deflection members coupled to the frame so that a pair of the deflection members form a deflection channel therebetween, each deflection member being elongate and narrow and having at least one bend between opposite frame members, wherein the at least one bend protrudes above the ground level plane of the frame.

In some embodiments, a method of soccer training can include: providing the soccer training device of one of the embodiments; performing a lighting of the illuminating contact sensor; striking the soccer training device having the illuminated illuminating contact sensor with a soccer ball to trigger the contact sensor; and counting each contact of a soccer ball with the soccer training device in the lighting sequence and/or changing color of the illuminating contact sensor after each contact.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
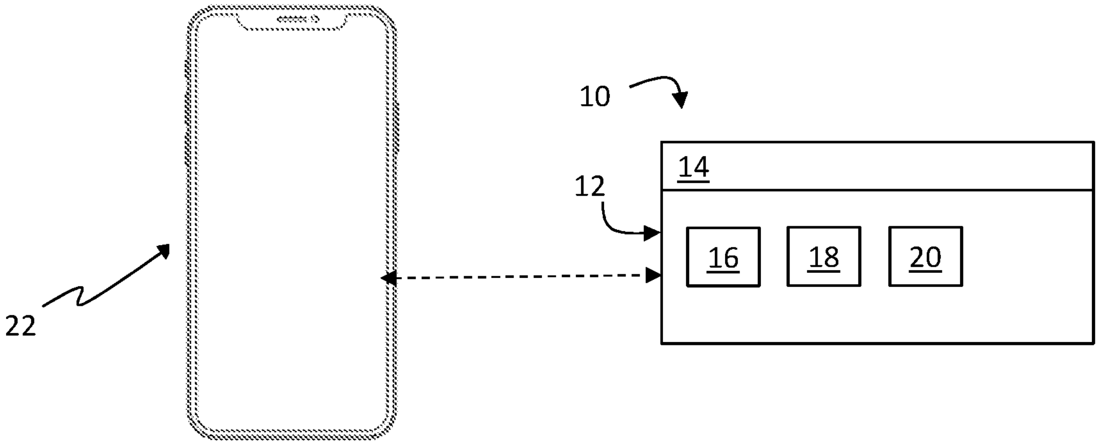
FIG. 1 illustrates an embodiment of an illuminating contact sensor.

The elements and components in the figures can be arranged in accordance with at least one of the embodiments described herein, and which arrangement may be modified in accordance with the disclosure provided herein by one of ordinary skill in the art.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, the present invention is related to soccer training equipment and kits that can be used to enhance soccer skill and performance development. The soccer training equipment can include an illuminating contact sensor that is adapted to include an illumination module that emits visible light of any color and a contact sensor module that detects contact with the sensor. The contact sensor module may include any type of sensor that can provide a detection signal to a controller so that when the contact sensor module detects a contact, the controller controls operation of the illuminating contact sensor. The contact sensor can have a force contact threshold above which the contact sensor senses a contact and below which the contact sensor does not count or consider the contact.

The embodiments of the soccer training equipment can include soccer training devices that are configured with a receptacle adapted to receive the illumination contact sensor therein such that the illumination module is visible through a front surface or aperture of the soccer training device or any coupling or integrating of the illumination contact sensor with a training device. This allows for the soccer training equipment to have an illuminating contact sensor for use in illuminating to draw attention from a player and to detect contact from a ball played to the soccer training equipment. Upon detecting contact from the ball, the illuminating contact sensor sends a contact signal to a central controller (e.g., smart phone with an application configured to control one or more of the illuminating contact sensors) to count the contact for the player. The soccer training equipment can come in various configurations, shapes, and sizes so long as they include a receptacle adapted to receive the illumination contact sensor through a front surface or aperture of the soccer training device or otherwise has the illuminating contact sensor coupled or integrated with the soccer training device. The receptacle can be adapted to loosely or firmly receive the illuminating contact sensor, which is considered a coupling, so that when a ball strikes the soccer training device, the motion is sensed as contact to the illumination contact sensor and the contact is counted. The receptacle can securely receive the illumination contact sensor so that there is no relative movement therebetween when struck with a soccer ball. The soccer ball contacts can be counted for various soccer training exercises and protocols. This counted soccer ball contact then allows for the central controller to move to a next phase of the soccer training.

Examples of an illuminating contact sensor include a BLAZEPOD (e.g., blazepod.com/pages/the-pods) and a FITLIGHT (e.g., fitlighttraining.com/trainer/), where these illuminating contact sensors and entire websites (blazepod.com and itlighttraining.com) are incorporated herein by specific reference in their entirety. See FIG. 1.

FIG. 1 illustrates the illuminating contact sensor 10, which can include a body 12 having a light emitter 14 and containing a contact sensor 16 (internal, such as in a circuit or computing system). The light emitter 14 can be a LED or other light that can emit one or more colors, such as red, orange, yellow, green, blue, indigo, violet, purple, or other. The contact sensor 16 can be any sensor that senses contact or motion, such as an accelerometer, inertia sensor, gyroscope sensor, or the like, such as used in the BLAZEPOD or FITLIGHT. The illuminating contact sensor 10 can include a sensor controller 18 (e.g., computer) that provides illumination data to the light emitter to control the emission of light, by controlling the color, initiation of illumination, duration of illumination, and termination of illumination, or any illumination pattern or sequence. The sensor controller 18 can receive contact data from the contact sensor 16, and log the contact data for each contact that is sensed. The sensor controller 18 can be operably coupled with a transceiver 20 that is configured to transmit the contact data or package of contact data of a plurality of contacts to a central controller 22 (e.g., tablet, smart phone, personal digital assistant, of the like, such as by WiFi or Bluetooth). The transceiver 20 can also receive operational data from the central controller 22 to the sensor controller 18 in order to control operation of the illumination contact sensor 10. Accordingly, the illuminating contact sensor 10 can communicate with the central controller 22 over a network, such as by Bluetooth, WiFi, etc. This allows for the illumination contact sensor 10 to be controlled by the central controller 22, such as an application on a mobile phone. Therefore, a soccer training protocol can be controlled so that the illumination contact sensor illuminates the light emitter and then counts the subsequent contact from the contact sensor being activated. The data associated with this sequence, such as the time between illumination and receiving a contact, can be recorded and provided as part of the contact data.

In some embodiment, the illuminating contact sensor 10 can be configured as a soccer training device. That is the illuminating contact sensor can be shaped or otherwise made to be a soccer training device. As such, any soccer training device can include an illuminating contact sensor 10 or an illuminating contact sensor 10 can be configured as an illuminating contact sensor.

The illuminating contact sensor 10 emits a first color. When the soccer training device is struck with a kicked soccer ball, the illuminating contact sensor senses the contact and then makes a change to the emitted color to either no color or a different color. A different soccer training device can then emit the first color. This process can be repeated with a plurality of colors changing when the soccer training device receives a contact of a sufficient force. The process can be performed with a plurality of soccer training devices having the illuminating contact sensor. The process can be performed with a plurality of different colors, where each player can be assigned a specific color.

In some embodiments, a soccer training system can include a plurality of the illuminating contact sensors and a central controller (e.g., mobile phone with application).

In some embodiments, the soccer training device can include a rebound board, which is a smaller board with a rebound body and at least one support member extending from the rebound body such that the rebound board is free standing and can receive the strike of a soccer ball without tipping over. The rebound body can include a material that is hard and allows for a soccer ball to strike and rebound from a front rebound surface so that a player can play the ball to the rebound body and receive a rebound ball therefrom. The rebound body can include a receptacle with the illuminating contact sensor that has a clear front surface so that when the player looks at the rebound board the illumination from the illuminating contact sensor is visible and clearly viewable. The receptacle can be in various configurations, such as integrated with the body of the device, a separate compartment to removably receive the illuminating contact sensor, a soft pocket with a pliable material for at least one receptacle surface, a hard pocket or brace with a hard body for at least one receptacle surface or any compartment, coupling configuration or integration. While the front of the receptacle can be the rebound board body and/or clear front receptacle surface (e.g., glass, plastic, plexiglass, flexible plastic, opening or hole, aperture, etc.) or an aperture (e.g., with frame therearound), the back can be at least one pliable member formed of a pliable material or a hard retainer forming the receptacle. The pliable material or hard retainer can be attached to the rebound board body and/or clear front receptacle body to form the receptacle. The body of the rebound board can be of any type, and may include a clear body as the contact surface where the illuminating contact sensor can be seen. In an integrated embodiment, the front of the rebound board can be the illuminating contact sensor, or include the illuminating contact sensor. Therefore, the illuminating contact sensor can emit light away from the contact face of the rebound board by emitting through a clear surface or an aperture.

Figure 2A:
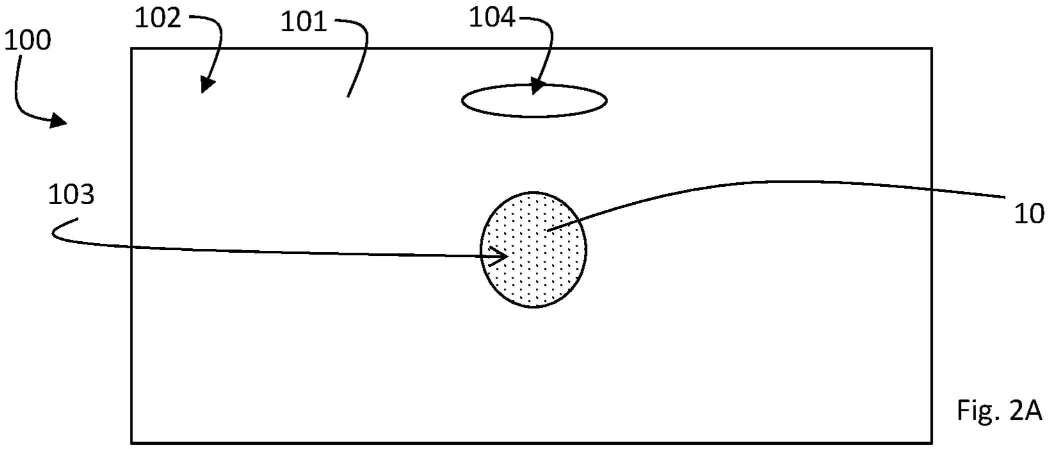
FIG. 2A illustrates a front view of an embodiment of a rebounder.
Figure 2B:
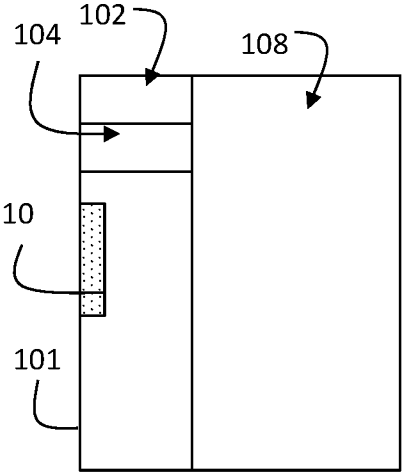
FIG. 2B illustrated a side view of the rebounder with an embodiment of a brace member extended with the hinge open.
Figure 2C:
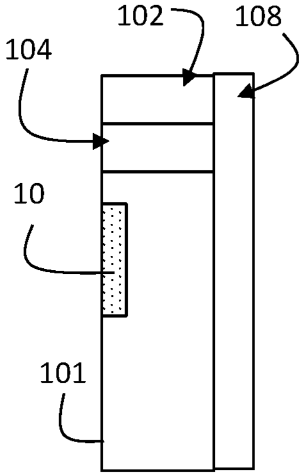
FIG. 2C illustrates a side view of the rebounder with the brace member collapsed with an embodiment of a hinge closed.
Figure 2D:
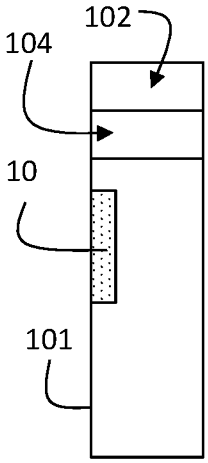
FIG. 2D illustrates a side view of the rebounder without the brace member.
Figure 2E:
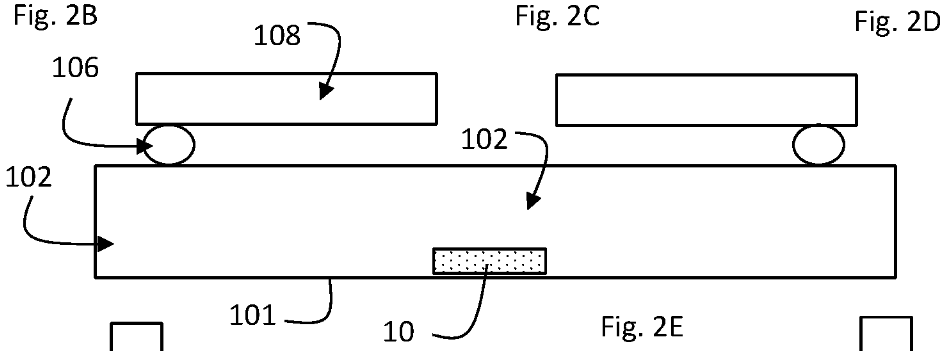
FIG. 2E illustrates a top view of the rebounder with the brace member collapsed with the hinge closed.
Figure 2F:
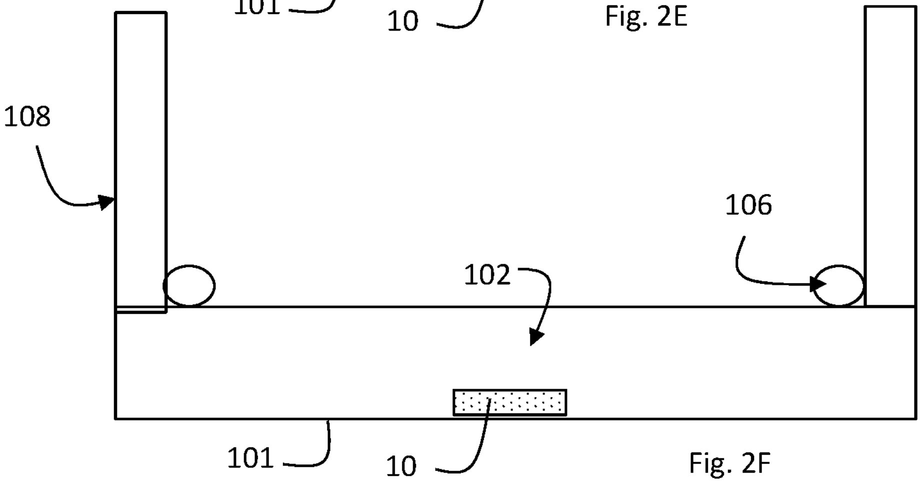
FIG. 2F illustrates a top view of the rebounder with the brace member extended and the hinge open.

FIGS. 2A-2F illustrate different views of a rebounder 100 having an internal (e.g., coupled or integrated) illuminating contact sensor 10. FIG. 2A illustrates a front view of the rebounder 100. FIG. 2B illustrated a side view of the rebounder 100 with the brace member 108 extended with the hinge 106 open. FIG. 2C illustrates a side view of the rebounder 100 with the brace member 108 collapsed with the hinge 106 closed. FIG. 2D illustrates a side view of the rebounder 100 without the brace member 108. FIG. 2E illustrates a top view of the rebounder 100 with the brace member 108 collapsed with the hinge 106 closed. FIG. 2F illustrates a top view of the rebounder 100 with the brace member 108 extended and the hinge 106 open. The rebounder 100 includes a body 102 having the illuminating contact sensor 10 coupled or integrated therewith so that light is emitted in the direction that the front face 101 of the body 102 faces. The rebounder 100 includes a body 102 having a receptacle 103 that includes the illuminating contact sensor 10 therein, which can fill the respectable 103 as shown. The receptacle 103 can be sized to fit the sensor 10. The body 102 can include a handle 104, which can be an aperture as illustrated herein. The body 102 can be attached to a hinge 106 and the hinge 106 can rotatably couple a brace member 108 to the body 102.

The figures show a rectangular rebound board having two side extending support members connected by foldable hinges with cutouts for reduced weight and for hand grips for facilitating transportation. The clear front receptacle body in the round hole is a clear plastic body.

Figure 3A:
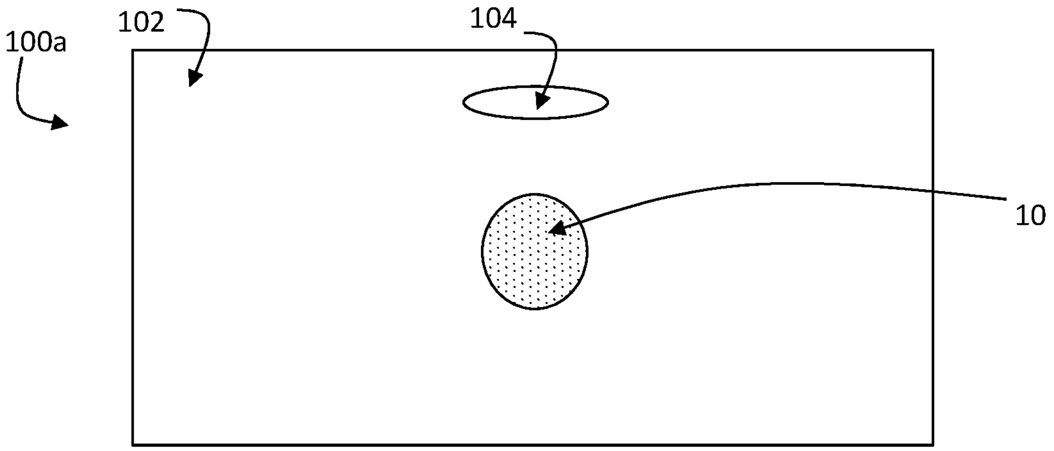
FIG. 3A illustrates a front view of an embodiment of a rebounder.
Figure 3B:
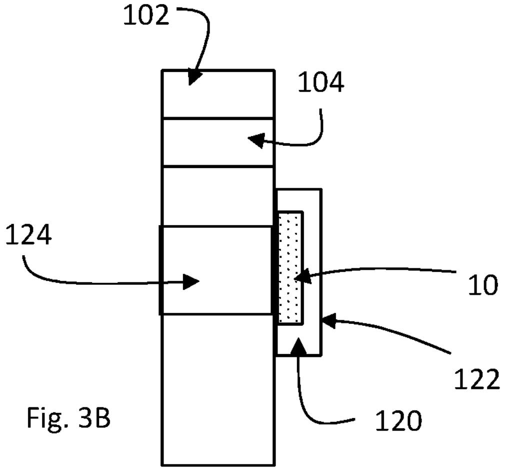
FIG. 3B illustrates a side view of the rebounder without the brace member.
Figure 3C:
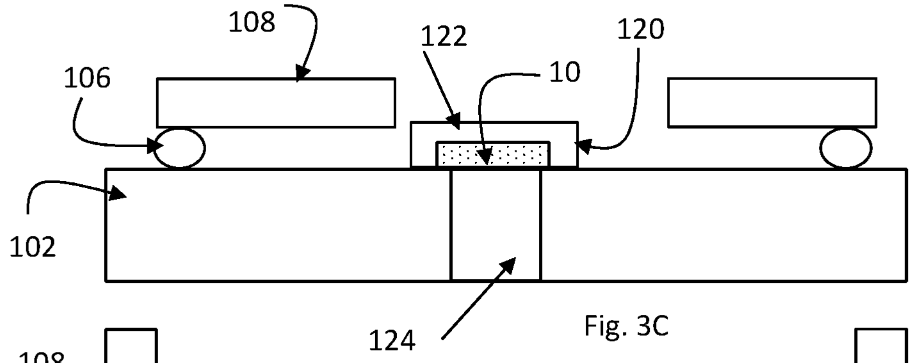
FIG. 3C illustrates a top view of the rebounder with the brace member collapsed with the hinge closed.
Figure 3D:
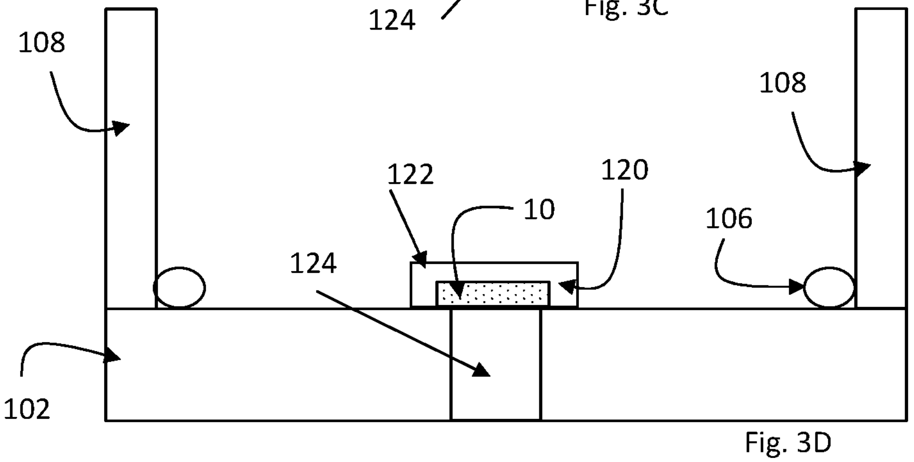
FIG. 3D illustrates a top view of the rebounder with the brace member extended and the hinge open.

FIGS. 3A-3D illustrate different views of a rebounder 100*a* having an external (e.g., coupled, in receptacle, etc.) illuminating contact sensor 10. FIG. 3A illustrates a front view of the rebounder 100*a*. FIG. 3B illustrates a side view of the rebounder 100*a* without the brace member 108. FIG. 3C illustrates a top view of the rebounder 100*a* with the brace member 108 collapsed with the hinge 106 closed. FIG. 3D illustrates a top view of the rebounder 100*a* with the brace member 108 extended and the hinge 106 open. As shown, the body 102 includes at least a portion of a receptacle 120, or defines at least a portion of the receptacle. The receptacle 120 can be defined by the body 102 and a receptacle member 122, which forms the receptacle cavity therebetween. Also, the body 102 include a light aperture 124 that is optically aligned with the receptacle 120 and sensor 10 located therein. The brace members 108 open from the sides and are vertical when stowed or deployed by moving the hinge 106. The light aperture 124 can be a clear member (e.g., light carrier), such as glass, plexiglass, Pyrex, polycarbonate, or other, or it can be an aperture with only air as the light carrier.

Figure 3E:
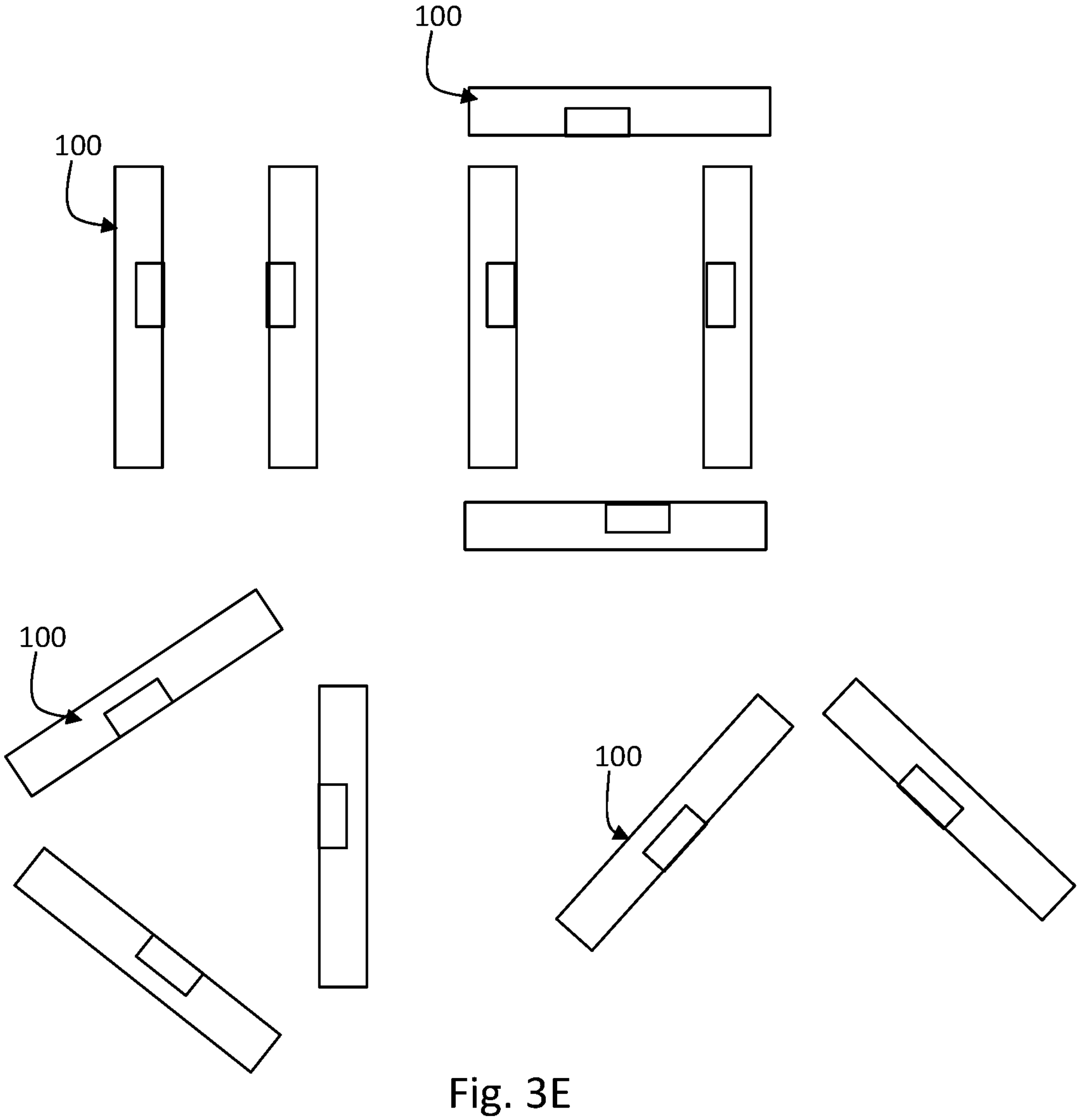
FIG. 3E shows how a plurality of the rebounders can be arranged.

FIG. 3E shows how a plurality of the rebounders 100 can be arranged; however, other arrangements can be used for one or more soccer players. FIG. 3E shows a pair of rebound boards (or three boards or more) that can be placed side-by-side for soccer training, where the illuminated rebound board is active to receive a ball, which allows for a sequence of the boards to be played with the ball as illuminated. However, any number of boards can be used, whether in a line, opposing each other, faces of a triangle, square, or other polygon, etc. FIG. 3E shows different arrangements of groups of the rebound boards having the illuminating contact sensors facing the middle. These boards only have an aperture for directing the emitted light of the illuminating contact sensor.

Figure 4A:
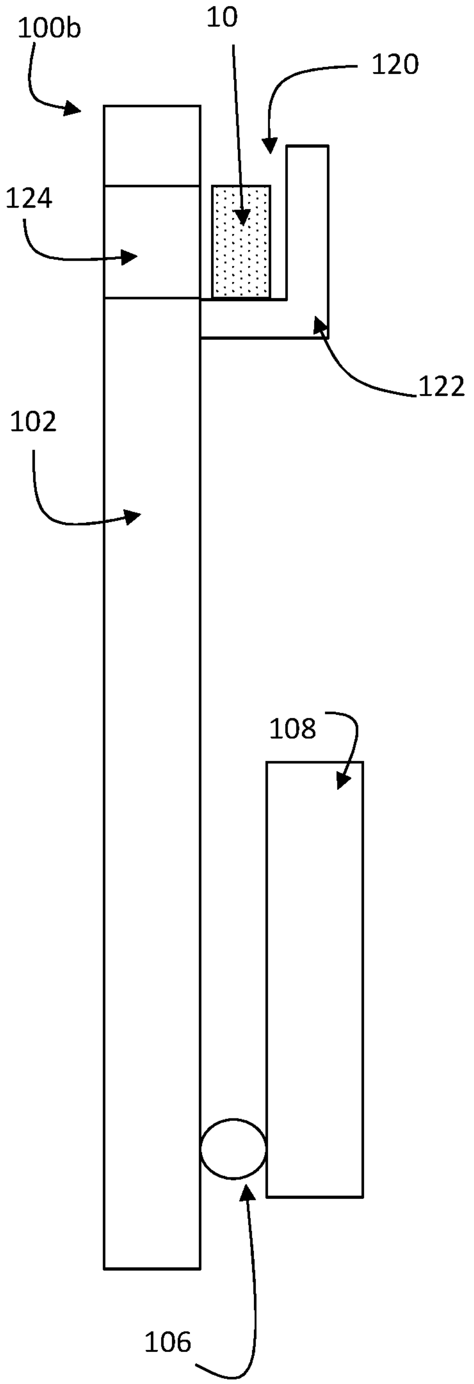
FIG. 4A illustrates a top view of the rebounder with the brace member collapsed with the hinge closed.
Figure 4B:
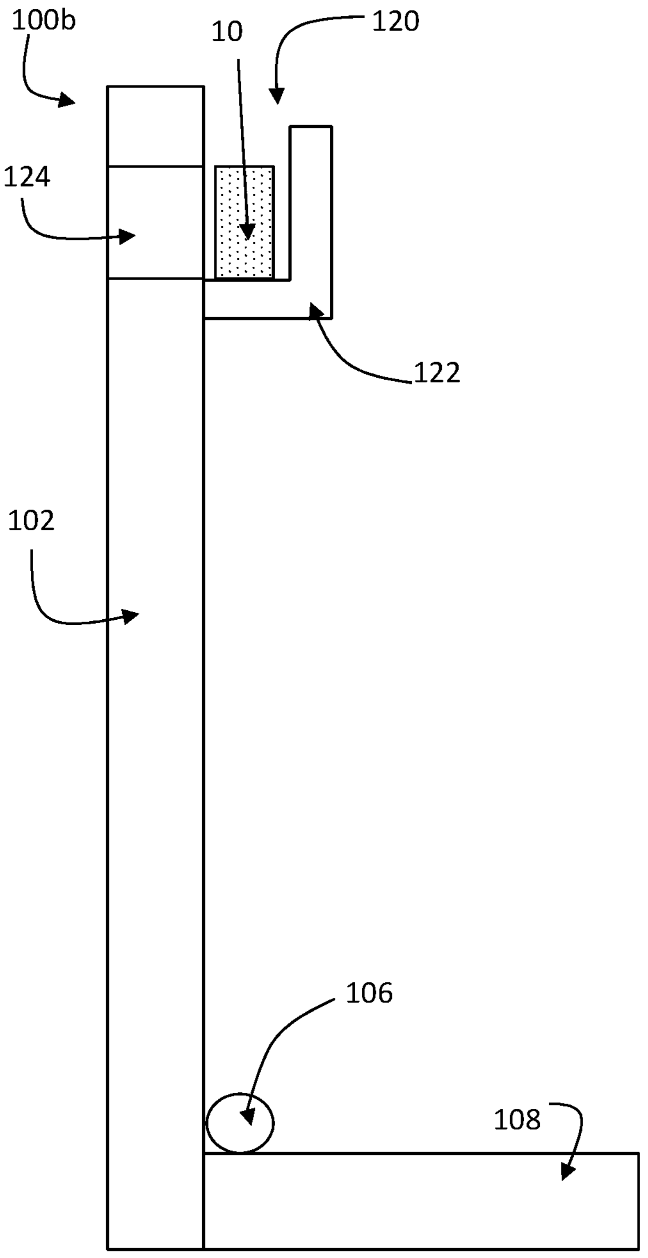
FIG. 4B illustrates a top view of the rebounder with the brace member extended and the hinge open.

FIGS. 4A and 4B show an embodiment of a rebounder 100*b* that has the brace member 108 that folds from a vertical stored (collapsed) position to a horizontal used (extended) position. FIG. 4A illustrates a top view of the rebounder 100*b* with the brace member 108 collapsed with the hinge 106 closed. FIG. 4B illustrates a top view of the rebounder 100*b* with the brace member 108 extended and the hinge 106 open. The brace member 108 is at the bottom where the sensor 10 is on the top in the receptacle 120 formed from the receptacle body 122.

Figure 5A:
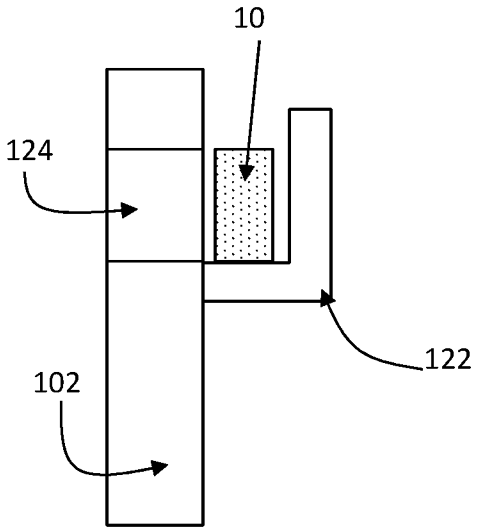
FIG. 5A shows a cross-sectional view of the rebounder showing the receptacle member forming the recess with a light aperture (e.g., light port) in the body so that light from the sensor shines therethrough.

FIG. 5A shows a cross-sectional view of the rebounder showing the receptacle member 122 forming the recess with a light aperture 124 (e.g., light port) in the body 102 so that light from the sensor 10 shines therethrough. The light port 124 can be an aperture or an optical member in the body 102.

Figure 5B:
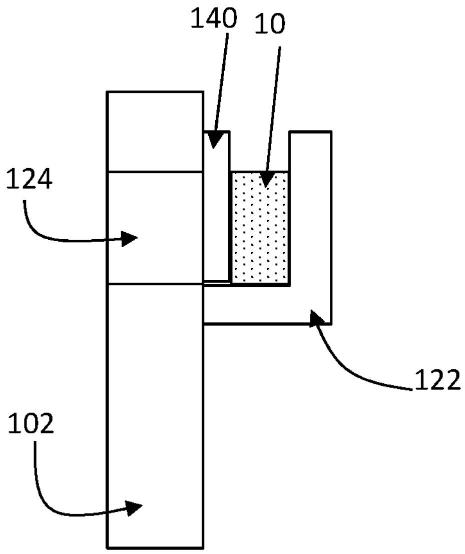
FIG. 5B shows an optical member between the sensor and the light port of a rebounder.

FIG. 5B shows an optical member 140 between the sensor 10 and the light port 124, such that the optical member may be transparent, whether or not a lens with optical shaping properties.

Figure 5C:
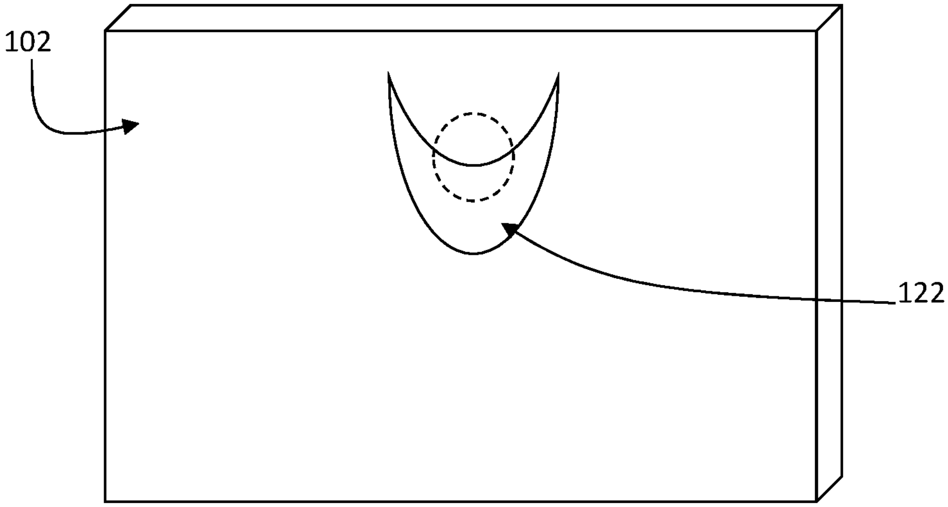
FIG. 5C shows a pouch shaped receptacle member to form the receptacle on the back of the body of the rebounder.

FIG. 5C shows a pouch shaped receptacle member 122 to form the receptacle on the back of the body 102.

Figure 6A:
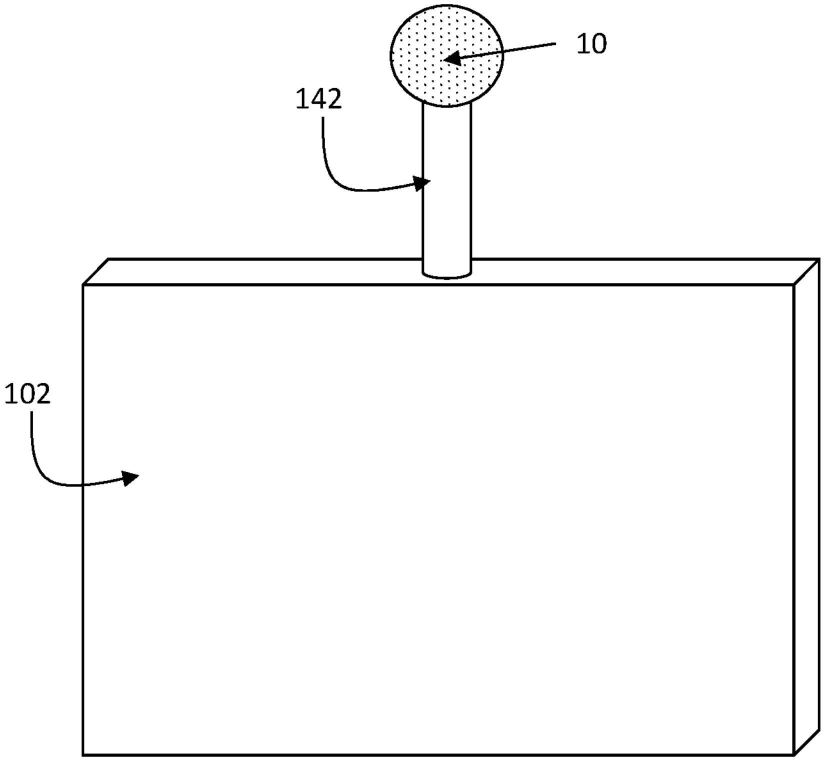
FIG. 6A shows the sensor attached to the body through an extension member.

FIG. 6A shows the sensor 10 attached to the body 102 through an extension member 142, which can be a stick, rod, pole, or other member that extends the sensor 10 away from the body. The contact from the soccer ball still causes the sensor 10 to activate.

Figure 6B:
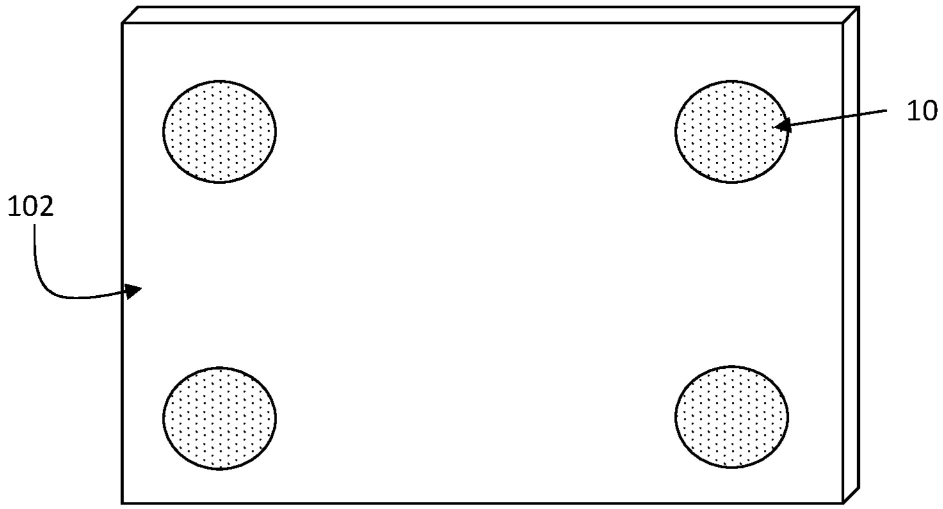
FIG. 6B illustrates a rebounder with a plurality of sensors.

FIG. 6B illustrates a rebounder with a plurality of sensors 10, which can be integrated or removably coupled with the body 102 in accordance with the embodiments described herein. Multiple sensors 10 emit multiple colors for the same rebounder, which can be used in soccer training for aiming at different colors or multiple people assigned to the multiple colors. For example, all four sensors may show four different colors so four different players are trying to strike the same rebounder.

Figure 9:
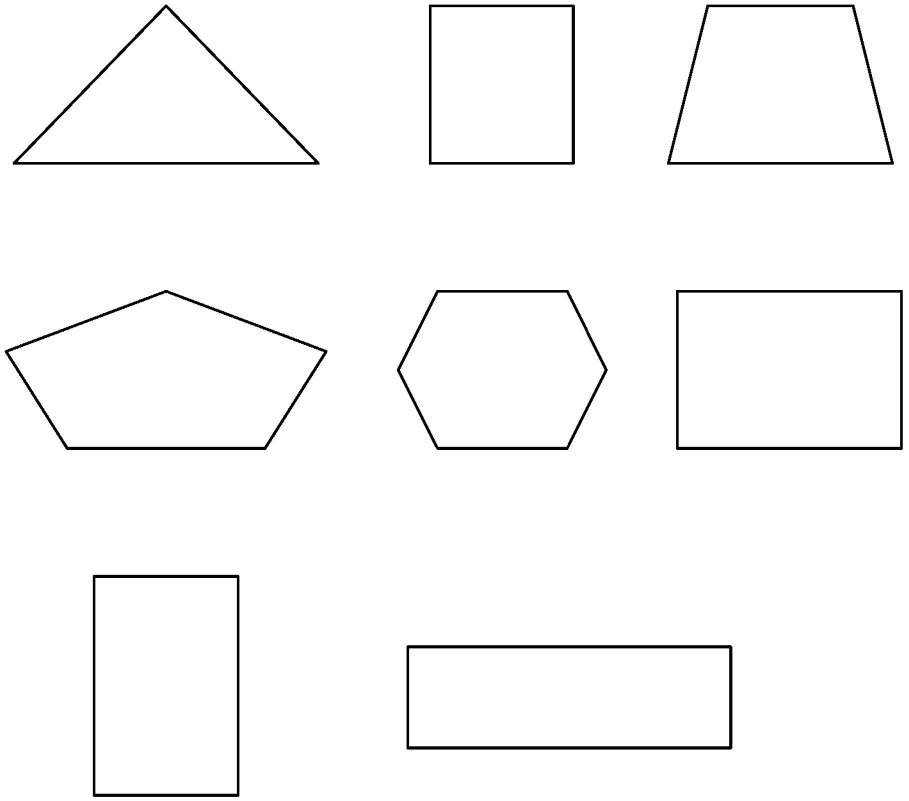
FIG. 9 shows some example front surface shapes that can be used for the rebounders described herein.

FIG. 9 shows some example front surface shapes that can be used for the rebounders described herein. Notably, the sizing can be at least a foot wide, and at least a foot tall. The thickness can depend on the material, but generally should be thick enough to have little to no deflection when hit with a soccer ball so that most of the force is applied to the rebound of the ball. The thickness can generally be 1 inch thick, but may vary. The width can range from 1 foot to 4 feet, 1 foot to 3 feet, or 1 foot to 2 feet. The height can range from 1 foot to 4 feet, 1 foot to 3 feet, or 1 foot to 2 feet. Various width and heights can be used to make different sizes and shapes.

Examples of rebound board having the sensor receptacle can include a triangular rebound board and one bottom extending support member connected by a foldable hinge, with a black plastic pliable receptacle with an aperture in the rebound board body to provide the clear front receptacle surface.

Figure 7A:
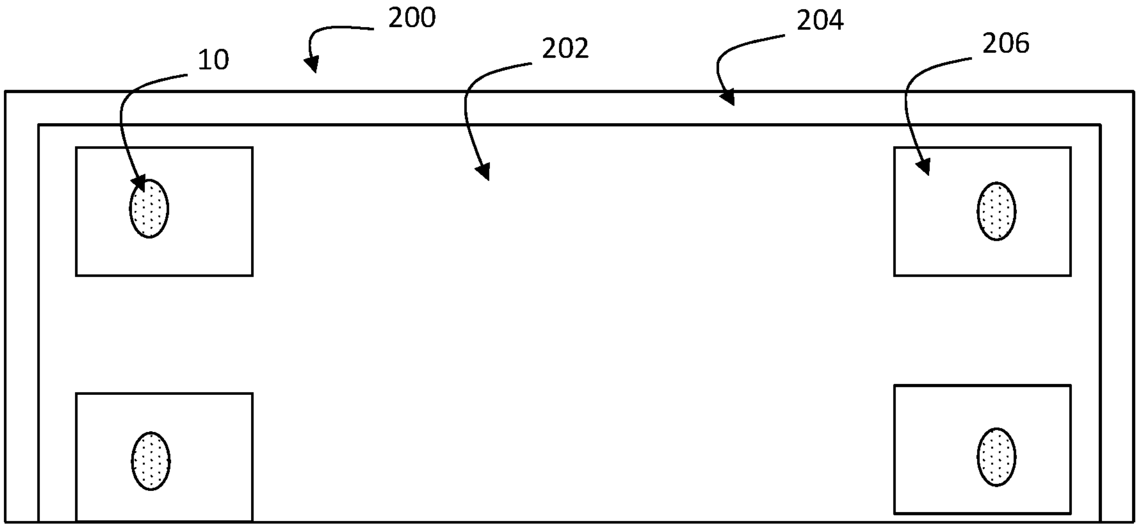
FIG. 7A illustrates an embodiment of a soccer training device configured as a goal target.

FIG. 7A illustrates an embodiment of a soccer training device configured as a goal 200, which can also be considered a rebounder as the ball does not go past. The goal 200 (e.g., a soft rebounder of a soft material, such as canvas) includes a body 202 that is usually fabric, canvas, plastic, net, or other flexible or bendable material. The goal 200 can be attached to a regular goal to cover the goal mouth by being attached to the frame of the goal (e.g., to posts and crossbar). The goal 200 can be attached by straps, bungie cords, string, Velcro, or other attachment. The goal 200 can include a goal frame 204 that may be a portion of the body 202 painted as a goal or it may be a goal frame member (e.g., to posts and crossbar, metal, plastic, etc.). The body 202 includes target members 206 placed at strategic locations where a player should strike the ball to, such as the corners. The target members 206 may be colored or marked differently from the body 202. The target members 206 each include a sensor 10, which can be included in a receptacle formed as described herein. A receptacle member 208 may be attached or attachable to the target member 106 that is adapted to retain the sensor 10. The target members 206 can be removable from the body 202 or integrated therewith.

Figure 7B:
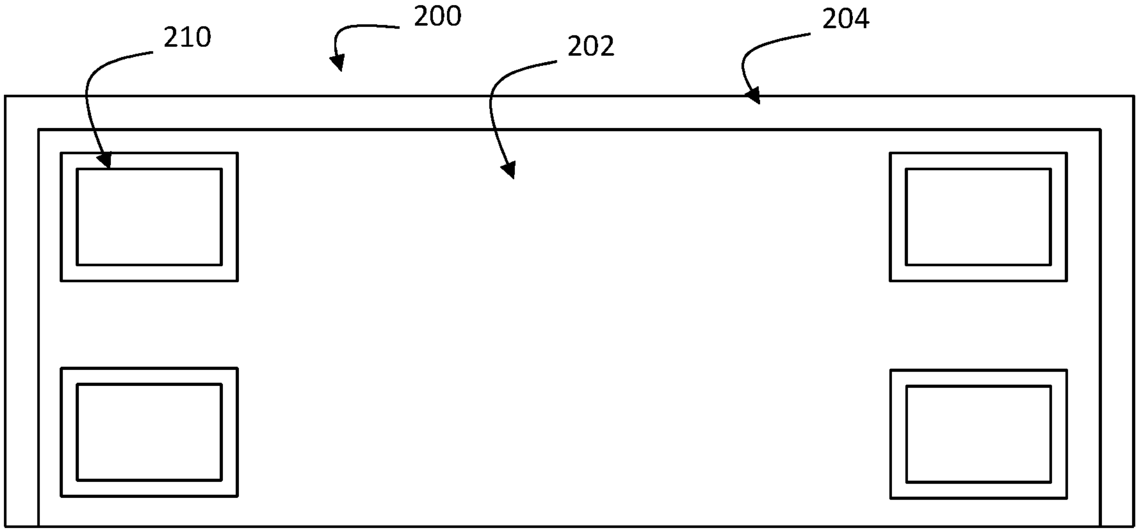
FIG. 7B shows the target members removed to show the Velcro target fastener.

FIG. 7B shows that the target members 206 removed to show the Velcro target fastener 210. The Velcro target fastener 210 can be in any shape, but a rectangle or square can be matched to a rectangle or square target member 206. Round or other shapes may also be used. The Velcro target fastener 210 may include the opposite Velcro member attached to the target members 206 to provide for the Velcro fastening.

Figure 7C:
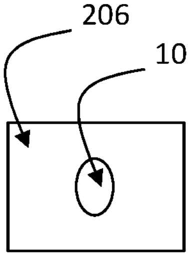
FIG. 7C illustrates the front view of a target member showing the sensor that illuminates through a light port.
Figure 7D:
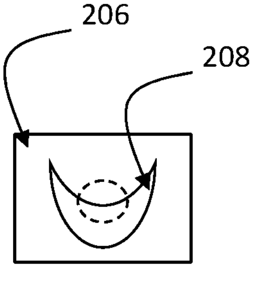
FIG. 7D shows a back view of the target member showing the receptacle member and body forming the sensor receptacle.
Figure 7E:
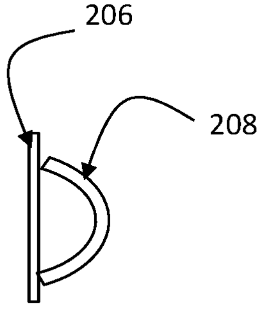
FIG. 7E shows a top view of the target member showing the receptacle member forming the sensor receptacle.

FIG. 7C illustrates the front view of a target member 206 showing the sensor 10 that illuminates through a light port, which can be a light transmissive material (e.g., plexiglass, plastic etc.) or an air aperture. FIG. 7D shows a back view of the target member 206 showing the receptacle member 208 and body forming the sensor receptacle. FIG. 7E shows a top view of the target member 206 showing the receptacle member 208 forming the sensor receptacle.

In some embodiments, the soccer training device can include a goal barrier that includes at least two different markers with receptacles adapted to receive the illuminating contact sensor. The goal barrier can include a substrate, such as a solid, pliable, flexible, rebounding, net, or other barrier that can either represent a goal or being outfitted to the frame of a goal. The markers can be adapted to be coupled with the barrier and include the clear front receptacle surface that allows for the illuminated illuminating contact sensor to be visible and observable. The markers can be adapted to allow for the receptacle to be accessed for placement and withdrawal of the illuminating contact sensor, which can be placed into the receptacle for training and removed therefrom once finished.

The figures show an example of the goal barrier having four different markers arranged at the corners. The clear front receptacle surface having the illuminating contact sensor are shown. The barrier material is pliable and functions as a goal with the lines designating the goal mouth having the different markers. The markers are removably attached to the barrier material, such as by Velcro as illustrated, which allows the markers to be removed to access the receptacle. The markers include an aperture that allows for the clear front receptacle to protrude or be visible there through. The markers can be outfitted with fastener straps adjacent to the aperture to couple with the receptacle. FIG. 4A shows a receptacle having the clear front receptacle surface and pliable pouch that couples with the markers.

Figure 10:
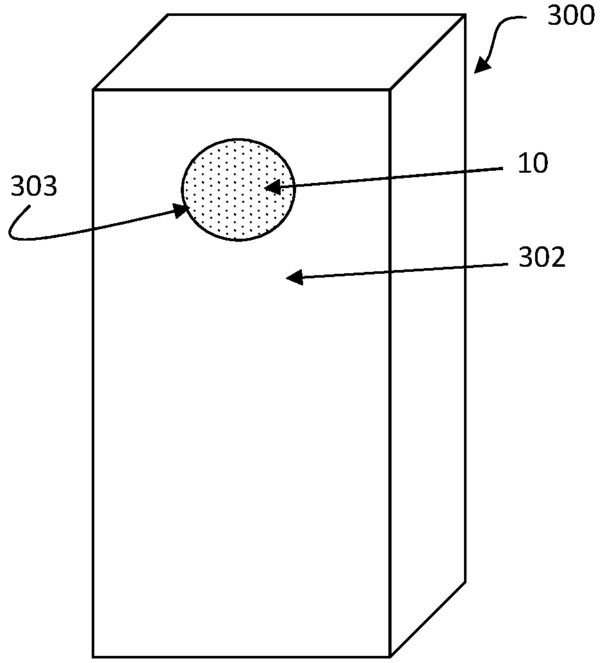
FIG. 10 illustrates an inflatable barrier having an inflatable body with a sensor (illuminating contact sensor).

Another embodiment of a soccer training device can an inflatable barrier that is sized to represent a player. FIG. 10 illustrates an inflatable barrier 300 having an inflatable body 302 with a sensor 10 (illuminating contact sensor). Such a barrier 300 can include a receptacle 303 having a clear front receptacle surface and pliable pouch that receives an illuminating contact sensor, or the sensor 10 is integrated therewith. A kit can include such an inflatable barrier and two rebound boards, which provides at least part of a kit of the present invention. The inflatable barrier can receive a contact by a player or by the ball to activate the contact sensor. For example, the inflatable barrier can be hit with a soccer ball cross to count the contact for a successful hit. Also, the inflatable barrier can be activated when placed as a defender for an unsuccessful pass (e.g., defender got the ball). This allows for different inflatable barriers to be used in drills, such as receiving teammates or opposing defenders. While shown to be rectangular, the inflatable body 302 can have any shape, and can mimic human shapes, including height sizes for relevant play ages, from youth to adult (e.g., 3.5 feet to 6.5 feet).

In some embodiments, the soccer training device is configured to be an inflatable barrier and includes: an inflatable body dimensioned as an inflatable barrier of a human size; a receptacle body (e.g., as shown herein) attached to the inflatable body or formed therein; and a clear front receptacle surface or aperture associated with the front surface of the body and forming a part of a receptacle with the receptacle body. The sensor can be integrated with the inflatable barrier or insertable and removable from the receptacle.

Figure 11:
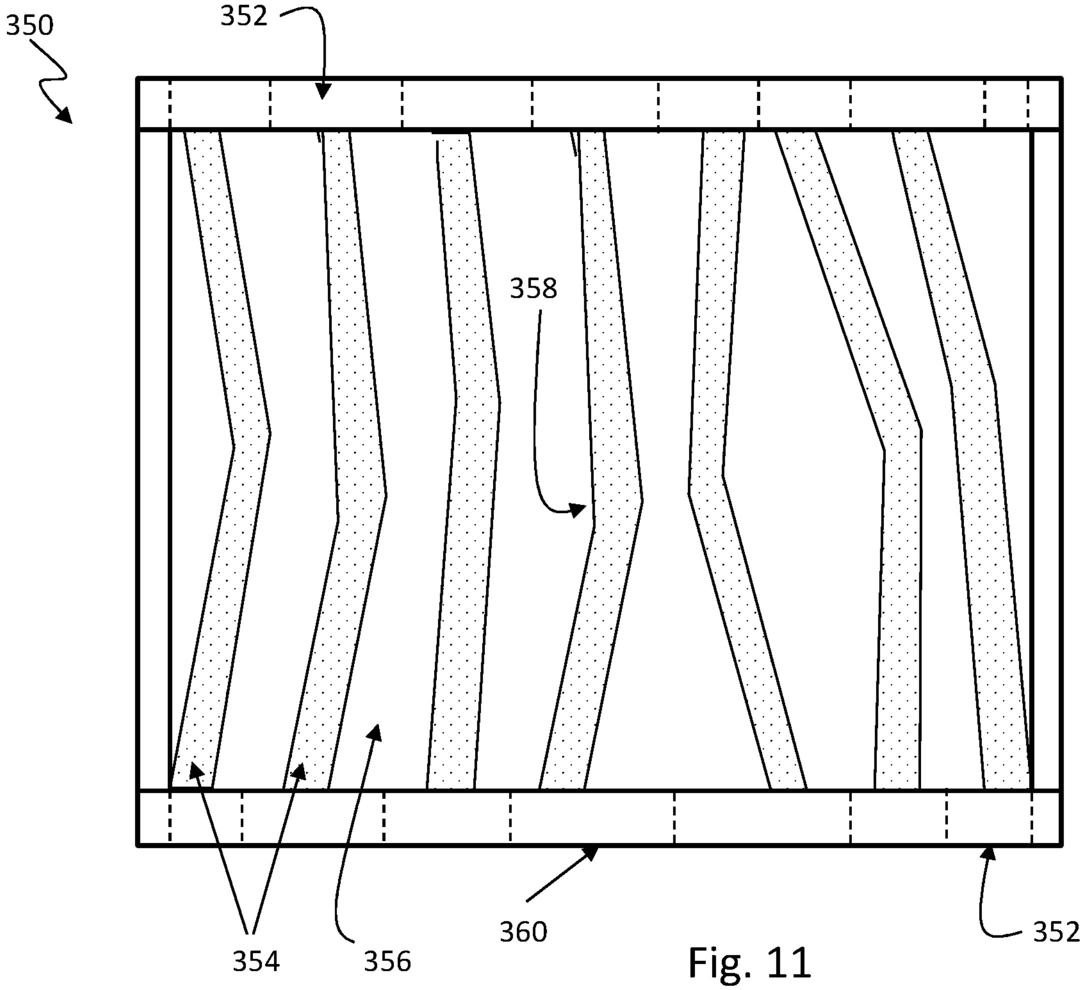
FIG. 11 illustrates top view of a soccer shot deflector.

In some embodiments, a soccer training device configured as an inflatable device includes: an inflatable body dimensioned as an inflatable barrier of a human size; an illuminating contact sensor coupled or integrated with the inflatable body so that a light emitter is visible and so that a contact with the inflatable body is sensed by a sensing module FIG. 11 illustrates top view of a deflector 350 for creating different soccer shot trajectories comprising: a frame 352 adapted to be laid on ground to form a ground-level plane; and a plurality of deflection members 354 coupled to the frame 352 so that a pair of the deflection members 354 form a deflection channel 356 therebetween, each deflection member 354 being elongate and narrow (e.g., tubular) and having at least one bend 358 between the frames 352. In some aspects, the deflector 350 includes at least five deflection members 352. In some aspects, each deflection member 354 is part of a segment 360, wherein a plurality of segments 360 include two frame end members 252 separated by at least one deflection member 354 (or at least two deflection members 354 forming a channel 356), wherein the frame end members 352 are adapted to connect to other frame end members 352 to form the deflector 350. In some aspects, the plurality of segments 360 are rearrangeable with respect to each other to form differently shaped and combinations of deflection channels 356.

FIG. 11 shows the deflector 350 with the frame 352 on the ground and the bends 358 pointing upward. Each bend 358 is some distance above the ground, so as to protrude from the surface of the page (e.g., frame 352). The different bends 358 can have different heights. Notably, all of the bends 358 can protrude in the same direction relative to the plane of the frame 352. When a soccer ball is shot in the longitudinal direction of a channel 356, the ball will be deflected by the deflection members 354 forming the channel 356 to give the soccer ball a deflected trajectory. This can be used for goalie training for improving reaction saves.

Figure 12:
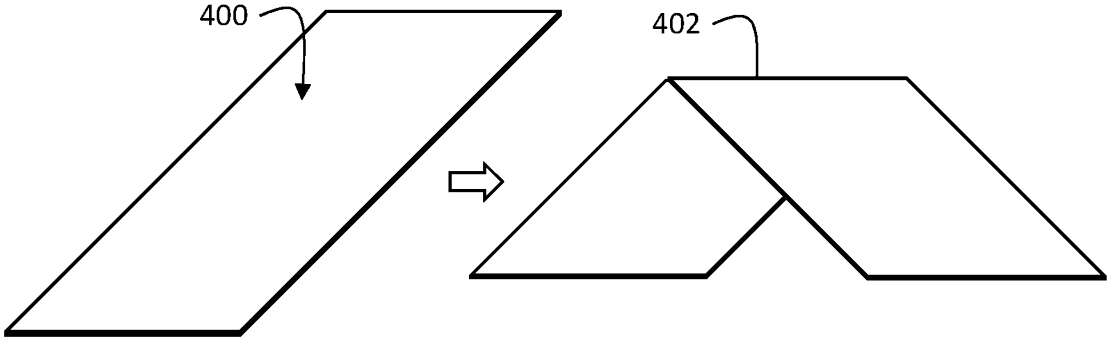
FIG. 12 shows the plastic sheets that can be folded into the "V" shaped barrier.

A soccer training device can also include plastic sheets that can include a fold line (not shown) so that they can be folded to form a "V" shaped barrier. The "V" barrier can be used in soccer drills and be provided as part of the kit. FIG. 12 shows the plastic sheets 400 that can be folded into the "V" shaped barrier 402. The "V" shaped barrier 402 can then be used for soccer training, such as a barrier, hurdle, or the like.

In another embodiment, a soccer training kit can include a deflector device that includes a frame having a plurality of deflection members that together in pairs forms deflection channels. The deflection members and deflection channels can all be different so that different deflection trajectories of balls can be played to a goalie. As shown in the incorporated provisional application, the deflector device is placed in front of a goal so that a ball can be kicked to the deflector device to cause a deflection so that a goalie has to react to the deflection trajectory. The deflection trajectory changes depending on the deflection member or deflection channel that causes the deflection. While not shown, the frame can be segmented so that each segment includes two segment ends bounding a deflection member extending therebetween. See dashed lines as defining different segments. This allow for the deflection members and deflection channels to be reconfigured and changed depending on the arrangement of the different sections. The different sections can be coupled in different ways, such as threading, snap-fits, friction fittings, or the like.

The rebound boards, goal barrier, and inflatable barrier can be configured with the illuminating contact sensors that communicate with the central controller (e.g., phone with app).

The receptacles can allow for the illuminating contact sensor to be placed therein for use and removed therefrom for storage or charging.

One rebound board can be used for passing, and keep track of the number of times the board is hit with a ball during a defined time period. The application on the phone can record the data to record the number of hits in the time period. The player can be a defined distance from the board. The time data can be associated with a player profile on the app for use in comparing and ranking players that want to compete for fastest times. Video can be taken with camera of the phone, which may be uploaded with the app for showing the speed a player can play the ballot the board. When using illumination, the time between illuminating and receiving the ball can be recording for competition purposes.

In another example of FIG. 3E, the boards can be in a defined orientation at defined angles and distances from each other. Then, an illumination sequence is initiated so that the player knows which board to strike, and once a board illuminates and hit, then the next board in the sequence illuminates. This can be done with any number of boards illuminating one or more colors, so that one or more players can compete (e.g., one player per color). Other variations of this type of drill can be implemented to visually show the board to hit, and then change board illumination for the next board to be hit. These drills can be set for numbers of contacts per defined times or to time how long it takes to complete a sequence.

The app can be configured with any type of training protocol that uses the lights and contact sensing.

In some embodiments, a soccer training device can include: a body having a front surface facing a direction; and an illuminating contact sensor associated with the body so that a light emitter is visible and capable of emitting light in substantially the same direction that the front surface faces and so that a force contact with the body is sensed by a sensing module.

In some embodiments, a soccer training device can include: a member having a front surface directed in a first direction; and an illuminating contact sensor associated with the member so that a light emitter is visible and capable of emitting light in the first direction and so that a sensing module senses an impact on the member by a soccer ball.

In some embodiments, a soccer training device can include: a soccer training member; and an illuminating contact sensor coupled with the soccer training member.

In some embodiments, a soccer training device can include: a soccer training member; a connecting member (e.g., elongate shaft) coupled to the soccer training member; and an illuminating contact sensor coupled with the connecting member, wherein a light emitter is visible and capable of emitting light in a first direction and so that a sensing module senses an impact on the soccer training member through the connecting member.

In some embodiments, a soccer training device can include: a soccer training member; and an illuminating contact sensor integrated with the soccer training member.

In some embodiments, a soccer training device can include: a soccer training member; and an illuminating contact sensor associated with the soccer training member, wherein a light emitter is visible and capable of emitting light in a first direction and so that a sensing module senses an impact on the soccer training member. In some aspects, the illuminating contact sensor is removably couplable with the soccer training member or body or integrated therewith. In some aspects, the device includes a receptacle for the illuminating contact sensor so that a contact of the device vibrates the illuminating contact sensor. In some aspects, the receptacle body is a pliable material or includes at least one adjustable strap and a retaining member. In some aspects, the body or soccer training member includes a clear front receptacle that is a clear member or an aperture for directing the emitted light. In some aspects, the receptacle body has a receptacle opening that opens upwardly when the soccer training device is in use, thereby the receptacle forming a top opened receptacle. In some aspects, the body includes an aperture adapted to allow light from the illuminating contact sensor to pass therethrough.

In some embodiments, the soccer training device is configured as a rebound board, target sheet, target net, dummy, or the like.

In some embodiments, the soccer training device is configured as a rebound board comprising at least one of: a body having a flat front surface that is rigid structurally sufficient to rebound a soccer ball; a receptacle in or on the body configured to house the illuminating contact sensor; an illuminating contact sensor integrated with the body or couplable with the body; optionally, a receptacle body attached to a back surface of the body; and/or optionally, a clear front receptacle surface associated with the front surface of the body and forming a part of a receptacle with the receptacle body. In some aspects, the rebound board can include a handle at a top region of the body, wherein the rebound board is portable and carriable with a single hand. In some aspects, the device includes at least one extending support coupled with the body of the rebound board. In some aspects, the extending support extends in a manner to support the body in a vertical position such that the extending support is normal or at some angle relative to the flat front surface of the body. In some aspects, the extending support is coupled to the body via a rotatable hinge, such that the extending support can be rotated from a flat position to an extended position for use. In some aspects, the device includes a plurality of extending supports coupled to the body.

In some embodiments, the clear front receptacle surface of receptacle is flat or there is an aperture for emitting the light therethrough. In some aspects, the body has a clear front receptacle surface that is hard and resilient. In some aspects, the body comprises an aperture that is at least partially covered by the clear front receptacle surface or an uncovered aperture for emitting the light.

In some embodiments, the soccer training rebound board can include: an illuminating contact sensor removably located in the receptacle so that a light emitter is visible through the clear front receptacle surface or aperture and so that a contact with the body is sensed by a sensing module; or an illuminating contact sensor integrated with the body so that a light emitter is visible through the clear front receptacle surface or aperture and so that a contact with the body is sensed by a sensing module.

In some embodiments, a soccer training device of one of the embodiments is provided and configured as a goal target barrier. The goal target barrier can include: a rectangular body having a front surface dimensioned as a soccer goal; a plurality of markers within a boundary of the soccer goal; a receptacle body attached to each marker; and a clear front receptacle surface associated with the front surface of the body and forming a part of a receptacle with the receptacle body.

In some embodiments, a goal target barrier can include: a rectangular body having a front surface dimensioned as a soccer goal; a plurality of markers within a boundary of the soccer goal; and an illuminating contact sensor coupled or integrated with the body so that a light emitter is visible and so that a contact with the body is sensed by a sensing module.

In some embodiments, a soccer training device is configured as a goal target barrier that includes: a rectangular body having a front surface dimensioned as a soccer goal; and an illuminating contact sensor coupled or integrated with the body so that a light emitter is visible and so that a contact with the body is sensed by a sensing module.

In some embodiments, a soccer training device is configured as a goal target barrier including: a rectangular body having a front surface dimensioned as a soccer goal; a plurality of markers within a boundary of the soccer goal; and an illuminating contact sensor coupled or integrated with at least one of the markers so that a light emitter is visible and so that a contact with the marker is sensed by a sensing module.

In some embodiments, a soccer training device is configured as a goal target barrier including: a rectangular body having a front surface dimensioned as a soccer goal; and an illuminating contact sensor coupled or integrated with at least one of the markers so that a light emitter is visible and so that a contact with the marker is sensed by a sensing module.

In some embodiments, a soccer training device configured as a goal target barrier includes: a rectangular body having a front surface dimensioned as a soccer goal; a plurality of markers within a boundary of the soccer goal; and an illuminating contact sensor coupled or integrated with at least one of the markers so that a light emitter is visible and so that a contact with the marker is sensed by a sensing module and so that a contact with the body is not sensed by the sensing module.

In some embodiments, a soccer training device configured as a goal target barrier includes: a rectangular body having a front surface dimensioned as a soccer goal; and an illuminating contact sensor coupled or integrated with at least one of the markers so that a light emitter is visible and so that a contact with the marker is sensed by a sensing module and so that a contact with the body is not sensed by the sensing module. In some aspects, the plurality of markers are different colors. In some aspects, the plurality of markers are removable from a body of the goal barrier. In some aspects, the plurality of markers include a fastener to removably fasten to the body. In some aspects, the body is configured to mount to a soccer goal by connecting to one or more soccer goal frame members. In some aspects, the markers form a part of the surface of the body located in at least two corners or four corners. In some aspects, the markers attach to a front surface of the body. In some aspects, the markers are adapted to extend from a side surface or side edge of the body. In some aspects, the receptacle having the sensor or configured to retain the sensor is removable from the rectangular body and/or the marker.

In some embodiments, a soccer training device is configured to be inflatable and includes: an inflatable body dimensioned as an inflatable barrier of a human size; a receptacle body attached to the inflatable body; and a clear front receptacle surface or aperture associated with the front surface of the body and forming a part of a receptacle with the receptacle body. The sensor can be integrated or removable from the receptacle.

In some embodiments, a soccer training device configured as an inflatable device includes: an inflatable body dimensioned as an inflatable barrier of a human size; an illuminating contact sensor coupled or integrated with the inflatable body so that a light emitter is visible and so that a contact with the inflatable body is sensed by a sensing module.

In some embodiments, a deflector for creating different soccer shot trajectories comprising: a frame adapted to be laid on ground to form a ground-level plane; and a plurality of deflection members coupled to the frame so that a pair of the deflection members form a deflection channel therebetween, each deflection member being elongate and narrow and having at least one bend between the frames. In some aspects, the deflector includes at least 5 deflection members. In some aspects, each deflection member is part of a segment, wherein a plurality of segments include two frame end members separated by at least one deflection member, wherein the frame end members are adapted to connect to other frame end members to form the deflector. In some aspects, the plurality of segments are rearrangeable with respect to each other to form differently shaped and combinations of deflection channels.

In some embodiments, a kit can include a plurality of the soccer training devices.

In some embodiments, a kit can include one or more of the soccer training devices and a one or more of the illuminating contact sensors.

In some embodiments, a kit can include a downloadable application (or instructions on obtaining the application) to convert a device (e.g., phone or tablet) into a central controller that communicates with the illuminating contact sensors. In some aspects, the kit includes a plurality of the rebounder boards. In some aspects, the kit includes one or a pair of goal barriers. In some aspects, the kit can include one or more inflatable barriers. In some aspects, the kit can include a plurality of foldable plastic sheets that can fold into "V" shaped barriers. In some embodiments, a kit can include a deflector.

In some embodiments, a method of soccer training can include: performing a soccer training activity with one of the soccer training devices. In some aspects, the method of soccer training can include: performing a lighting sequence of the illuminating contact sensor; striking the soccer training device having the illuminated illuminating contact sensor to trigger a contact sensor; and counting each contact of a soccer ball with the soccer training device in the lighting sequence. In some aspects, the method can include performing the soccer training with a plurality of the soccer training devices. In some aspects, the method can include performing the soccer training with one or more soccer players with one or more soccer training devices. In some aspects, the illumination of the illuminating contact sensor indicates the soccer training device to be contacted with the soccer ball. In some aspects, the soccer training is controlled by a central controller configured as an application on a mobile device, which communicates with each illuminating contact sensor. In some aspects, the method can include placing an illuminating contact sensor in each receptacle of each soccer training device and communicatively coupling the illuminating contact sensor with the central controller. In some aspects, the method can include a user entering a training program or selecting a training program on the central controller. In some aspects, the method can include uploading a result or a score of a soccer training to a database on the internet, wherein the score is visible on a competition website or a competition application. In some aspects, the method can include performing a plurality of soccer trainings by a plurality of players, wherein the players are enrolled in a competition, and the central controller provides data of the soccer training to a competition platform on a competition website or competition application.

In one embodiment, the present methods can include aspects performed on a computing system. As such, the computing system can include a memory device that has the computer-executable instructions for performing the method. The computer-executable instructions can be part of a computer program product that includes one or more algorithms for performing any of the methods of any of the claims.

In one embodiment, any of the operations, processes, methods, or steps described herein can be implemented as computer-readable instructions stored on a computer-readable medium. The computer-readable instructions can be executed by a processor of a wide range of computing systems from desktop computing systems, portable computing systems, tablet computing systems, hand-held computing systems as well as network elements, base stations, femtocells, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those generally found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 8:
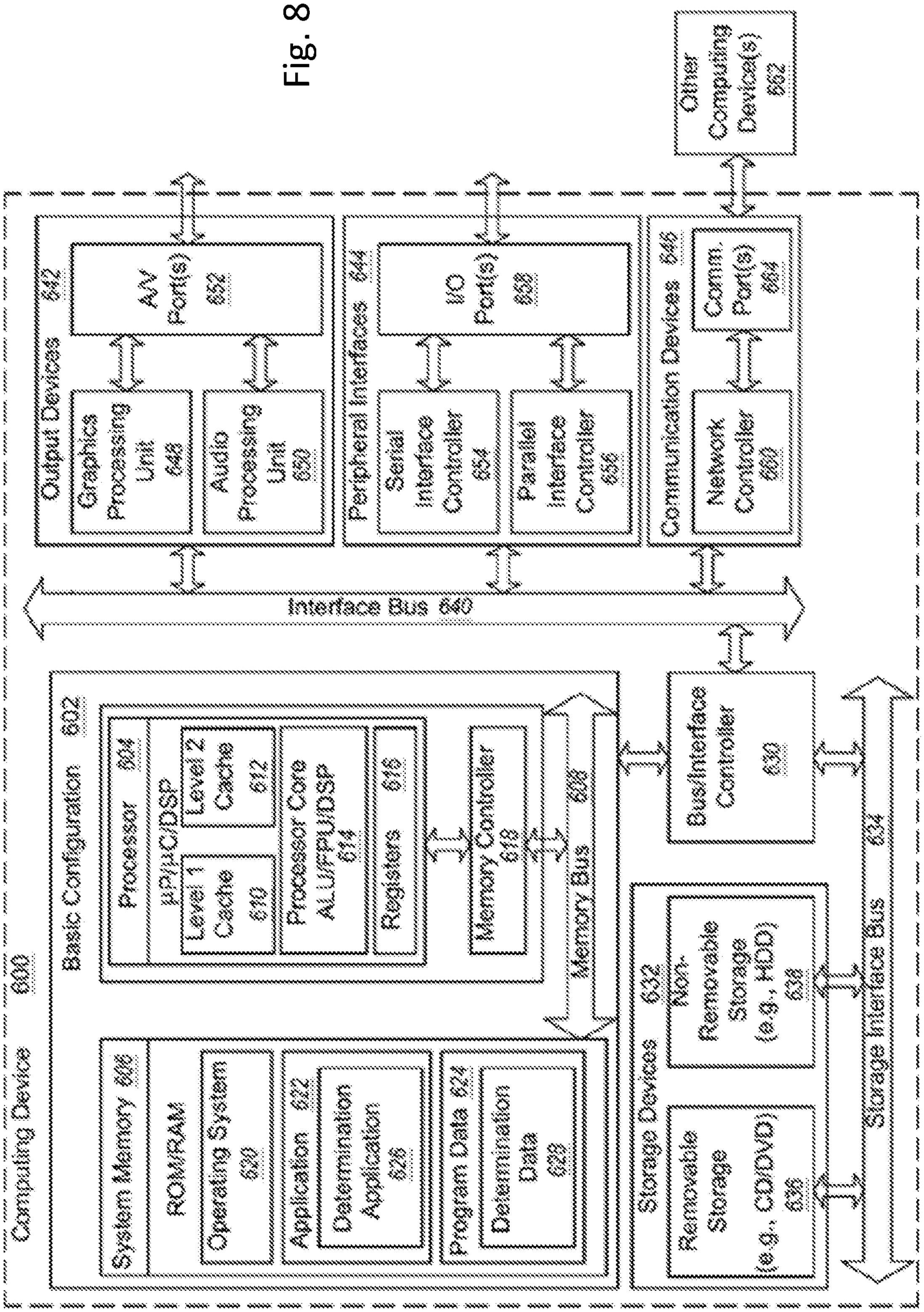
FIG. 8 illustrates an example computing device that can be used to perform the methods described herein, such as with the illuminating contact sensor or a controller thereof (e.g., remote controller).

FIG. 8 shows an example computing device 600 that is arranged to perform any of the computing methods described herein. In a very basic configuration 602, computing device 600 generally includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a determination application 626 that is arranged to perform the functions as described herein including those described with respect to methods described herein. Program Data 624 may include determination information 628 that may be useful for analyzing the contamination characteristics provided by the sensor unit 240. In some embodiments, application 622 may be arranged to operate with program data 624 on operating system 620 such that the work performed by untrusted computing nodes can be verified as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may generally be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. The computing device 600 can also be any type of network computing device. The computing device 600 can also be an automated system as described herein.

The embodiments described herein may include the use of a special purpose or general-purpose computer including various computer hardware or software modules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

One skilled in the art will appreciate that, for the processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A soccer training device comprising:

an illuminating contact sensor having a sensing module and a light emitter that emits visible light, wherein a force contact above a predetermined threshold is sensed by the sensing module and modulates the visible light emitted from the light emitter; and a soccer training member having:

a body having a front surface facing a first direction, wherein the front surface of the body is configured as a soccer rebounder that rebounds a soccer ball;

a receptacle in the body or attached to the body that is adapted to removably receive the illuminating contact sensor, wherein the receptacle is formed by the body and at least one receptacle member; and an optical aperture in the front surface of the body that is substantially aligned with the first direction and optically coupled with the receptacle so that placement of the illuminating contact sensor in the receptacle directs the light emitter through the optical aperture; and wherein:

the illuminating contact sensor is associated with the body so that a light from the light emitter is visible and in substantially the same first direction that the front surface faces and so that a force contact above a predetermined threshold with the body is sensed by a sensing module.

2. The soccer training device of claim 1, wherein the receptacle member is a pliable material.

3. The soccer training device of claim 1, the receptacle further comprising a clear front receptacle member.

4. The soccer training device of claim 1, wherein the receptacle has a receptacle opening that opens upwardly when the soccer training device is in use, thereby the receptacle forming a top opened receptacle.

5. The soccer training device of one of claim 1, wherein the soccer training member is configured as a rebound board or a goal target barrier.

6. The soccer training device of claim 5, configured as a rebound board comprising:

the body having a flat front surface that is rigid and structurally sufficient to rebound a soccer ball;

the receptacle in or on the body configured to house the illuminating contact sensor;

or a handle at a top region of the body, wherein the rebound board is portable and carriable with a single hand.

7. The soccer training device of claim 6, further comprising at least one extending support coupled with the body of the rebound board.

8. The soccer training device of claim 7, wherein the at least one extending support extends in a manner to support the body in a vertical position such that the extending support is normal or at some angle relative to the flat front surface of the body.

9. The soccer training device of claim 8, wherein the extending support is coupled to the body via a rotatable hinge, such that the extending support can be rotated from a flat storage position to an extended position for use.

10. The soccer training device of claim 7, comprising a plurality of the extending supports rotatably coupled to the body.

11. The soccer training device of claim 5 configured as a goal target barrier comprising:

a rectangular body having a front surface dimensioned as a soccer goal, wherein the body is configured to mount to a soccer goal by connecting to one or more soccer goal frame members;

a plurality of target members within a boundary of the soccer goal and attached to a front surface of the rectangular body that faces in the first direction; and a plurality of receptacles formed by the target members and a plurality of receptacle members, each target member having a receptacle and receptacle member; and wherein a plurality of the illuminating contact sensors are provided, which are removably couplable with the plurality of receptacles so as to illuminate in the first direction.

12. The soccer training device of claim 11, further comprising:

the plurality of target members are different colors;

the plurality of target members are removably attachable with the rectangular body of the goal target barrier;

the plurality of target members each include a fastener to removably fasten to the body; and the plurality of target members each attach to a front surface of the body.

13. The soccer training device of claim 11, wherein the receptacle is configured to be removable from the rectangular body and/or the target members.

14. The soccer training device of claim 1, wherein the receptacle member is a rigid material.

15. The soccer training device of claim 1, wherein the receptacle member includes at least one strap connecting a pliant member or a rigid member with the body of the soccer training member.

16. A soccer training device comprising:

a soccer training member having:

a body having a front surface facing a first direction, wherein the front surface of the body is configured as a soccer rebounder that rebounds a soccer ball;

a receptacle in the body or attached to the body that is adapted to removably receive an illuminating contact sensor, wherein the receptacle is formed by the body and at least one receptacle member; and an optical aperture in the front surface of the body that is substantially aligned with the first direction and optically coupled with the receptacle so that placement of the illuminating contact sensor in the receptacle directs the light emitter through the optical aperture; and wherein:

when the illuminating contact sensor is associated with the body a light from the light emitter is visible and in substantially the same first direction that the front surface faces and so that a force contact above a predetermined threshold with the body is sensed by a sensing module.

17. The soccer training device of claim 16, configured as a rebound board comprising:

the body having a flat front surface that is rigid and structurally sufficient to rebound a soccer ball;

the receptacle in or on the body configured to house the illuminating contact sensor; or a handle at a top region of the body, wherein the rebound board is portable and carriable with a single hand.

18. The soccer training device of claim 17, further comprising at least one extending support coupled with the body of the rebound board, wherein the at least one extending support extends in a manner to support the body in a vertical position such that the extending support is normal or at some angle relative to the flat front surface of the body, wherein the extending support is coupled to the body via a rotatable hinge, such that the extending support can be rotated from a flat storage position to an extended position for use.

19. The soccer training device of claim 16 configured as a goal target barrier comprising:

a rectangular body having a front surface dimensioned as a soccer goal, wherein the body is configured to mount to a soccer goal by connecting to one or more soccer goal frame members;

a plurality of target members within a boundary of the soccer goal and attached to a front surface of the rectangular body that faces in the first direction; and a plurality of receptacles formed by the target members and a plurality of receptacle members, each target member having a receptacle and receptacle member.

20. The soccer training device of claim 19, further comprising:

the plurality of target members are different colors;

the plurality of target members are removably attachable with the rectangular body of the goal target barrier;

the plurality of target members each include a fastener to removably fasten to the body; and the plurality of target members each attach to a front surface of the body.

* * * * *